United States Patent [19]

Long et al.

[11] Patent Number: 4,985,772
[45] Date of Patent: Jan. 15, 1991

[54] TELEVISION SIGNAL DECODER BYPASS SWITCH

[75] Inventors: Michael E. Long, Oak Brook; Peter Stramello, Arlington Heights, both of Ill.

[73] Assignee: Zenith Electronics Corporation, Glenview, Ill.

[21] Appl. No.: 406,226

[22] Filed: Sep. 12, 1989

[51] Int. Cl.$^5$ .................... H04N 5/268; H04B 11/16
[52] U.S. Cl. .......................... 358/181; 455/3;
455/4; 455/151; 307/140
[58] Field of Search ............ 358/181, 188, 190, 194.1;
455/3, 2, 4, 6, 151; 307/141, 125, 126, 140

[56] References Cited

U.S. PATENT DOCUMENTS

| | | | |
|---|---|---|---|
| 3,686,573 | 8/1972 | McVoy | 455/3 X |
| 4,276,562 | 6/1981 | Stewart et al. | 455/3 X |
| 4,577,221 | 3/1986 | Skinner, Sr. et al. | 455/3 X |
| 4,630,313 | 12/1986 | Damoci | 455/4 |
| 4,717,970 | 1/1988 | Long | 358/181 X |
| 4,783,846 | 11/1988 | Wachob | 455/151 |
| 4,941,048 | 7/1990 | Hartson et al. | 358/181 |

*Primary Examiner*—James J. Groody
*Assistant Examiner*—Mark R. Powell

[57] ABSTRACT

A TV decoder low loss switching system includes relay operated switch contacts for directly connecting an input signal without loss to a decoder tuner in the normal or enabled mode or bypassing the input signal to a TV in the bypass mode. The switch is parallelled by an impedance to permit a small amount of signal to be applied to the tuner (in the bypass mode) for data purposes. In one embodiment, a second set of simultaneously actuated contacts connects the output of the decoder to the output terminal. In another embodiment, a channel 3/4 modulator is supplied by the decoder and its output connected via a PIN diode to the output terminal. The PIN diode is biased into conduction by actuation of a transistor switch responsive to the microprocessor enabling the decoder. The conduction of the PIN diode permits the channel 3/4 modulator signal to pass to the output terminal.

10 Claims, 2 Drawing Sheets

{ 4,985,772 }

TELEVISION SIGNAL DECODER BYPASS SWITCH

CROSS REFERENCE TO RELATED APPLICATION

This application is related to, but in no way dependent upon, copending application Ser. No. 284,036, filed Dec. 14, 1988, entitled DECODER-OPERATED TELEVISION SIGNAL SWITCH, now U.S. Pat. No. 4,941,048, and assigned to Zenith Electronics Corporation.

BACKGROUND OF THE INVENTION AND PRIOR ART

This invention relates generally to television (TV) signal switching and particularly to an automatic switching system that selectively supplies television signals to a television signal utilization device, such as a television receiver or a video cassette recorder (VCR), either from a decoder output or from a cable (antenna) input in response to operation of the decoder. In conventional cable antenna television (CATV) systems, a television receiver is typically connected to an RF output terminal of a decoder. The decoder, which has an RF input terminal for receiving a plurality of program channel signals from a CATV distribution system, produces a signal output on only one channel. This channel is generally VHF channel 3 or VHF channel 4, referred to herein as channel 3/4. This arrangement restricts the use of the television receiver to channel 3/4 and requires that program channel selections be made via the tuner that is resident in the decoder. The variety of controllable functions generally available on a modern television receiver are therefore not available to a viewer. It is also unfortunate since in most CATV systems, the great majority of the program channel signals are not encoded and are capable of being received and processed directly by a television receiver that has a tuner capable of receiving the program channel frequencies, i.e. a "cable ready" television receiver. Viewers often use a signal splitter, in conjunction with a manually operable A/B switch, to permit coupling of either the decoder output signal or the CATV input signal to the television receiver. This arrangement however requires manual operation of the A/B switch and introduces signal loss (approximately 3 dB) because of the signal splitter.

In U.S. Pat. No. 4,783,846 issued Nov. 8, 1988, a number of different television signal switching arrangements are shown. The patented circuit couples a cable input signal through a self-contained switch device that includes a signal splitter that has a first output that goes to the converter input and a second output that goes to a stationary relay contact. The other relay contact may be supplied from the converter output and the movable relay contact is connected to an RF device such as a television receiver. The relay is energized from the converter by means of power supplied over the coaxial cable that interconnects the switch, the converter and the television receiver.

In the above cross referenced copending United States patent application, a simple add-on switch arrangement is provided that is powered from an external power wire. The external power wire is plugged into a switched AC outlet on the decoder and it is therefore energized whenever the decoder is energized. That circuit also has a signal splitter however.

The circuit of the present invention differs significantly from that of the patent and the copending application in that the need for a splitter is eliminated. In normal mode, practically no loss is encountered in the signal supplied to the decoder. In bypass mode, the input television signal is directly routed to the utilization device with only a small amount of signal being diverted to the decoder system. In most CATV systems, the decoder is tuned to a "homing" channel even when the decoder is nominally turned off. Diversion of some signal in the bypass mode enables the decoder to receive data from the head-end. The data is in digital form. Consequently, its signal to noise ratio may be much lower than that of video signals. The small amount of signal provided to the decoder system in the bypass mode keeps the decoder in communication with the cable head-end when the input signal is being supplied directly to the utilization device. Accordingly, with the present invention, the viewable signal is not diminished by a splitter and the decoder is kept in communication with the cable head-end.

OBJECTS OF THE INVENTION

A principal object of the invention is to provide a novel television signal decoder switch.

Another object of the invention is to provide an improved CATV viewing system.

A further object of the invention is to provide a decoder bypass switch arrangement with improved operating characteristics.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENTS

Figure 1:
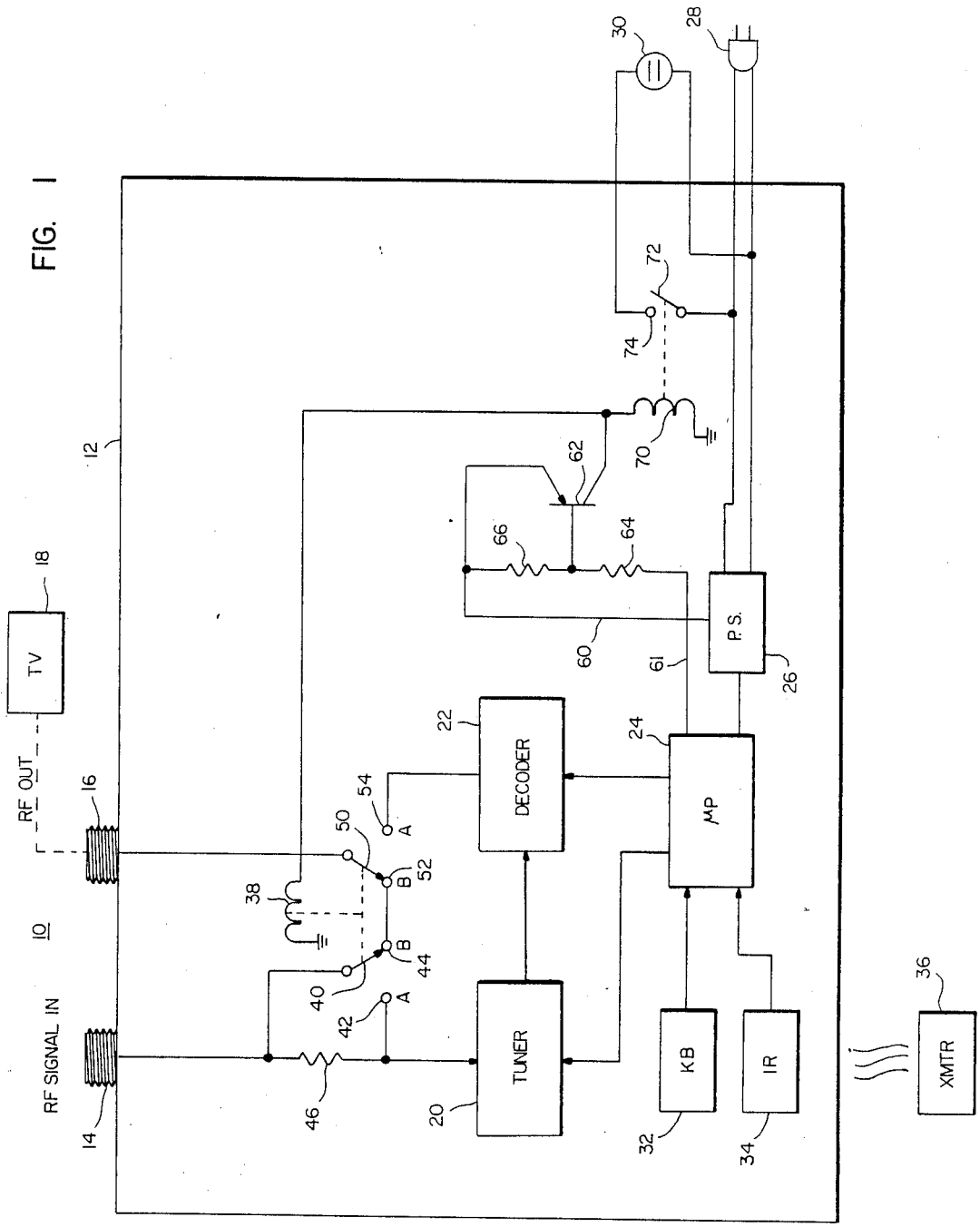
FIG. 1 is a partial block/schematic diagram of a TV signal switch system constructed in accordance with the invention.

Referring to FIG. 1, a TV signal decoder system is generally indicated by reference numeral 10 and includes a housing 12 having an RF signal input terminal 14 and an RF signal output terminal 16 therein. Output terminal 16 may be connected, by any suitable means (generally a coaxial cable), to a TV receiver 18 or to any other suitable television signal utilization device, such as a VCR. A tuner 20 supplies signals to a decoder 22. Both tuner 20 and decoder 22 are controlled by a microprocessor controller 24. A power supply 26, supplying power to the various system circuitry is connected, via a conventional line plug 28, to a source of external AC power (not shown). Microprocessor 24 is continuously powered by power supply 26 and "turns on" the decoder system, i.e. enables the decoder to process signals, in response to an appropriate input control signal from the keyboard or IR transmitter. A conventional AC outlet 30 is connected in a switched arrangement such that the outlet 30 is only energized when microprocessor 24 is commanded by the user to turn on the decoder system. As mentioned, microprocessor 24 is controlled from a keyboard 32 or via signals supplied by an IR amplifier 34. Such signals may be conventionally transmitted by an IR transmitter 36 or the like.

A bypass switch constructed in accordance with the invention includes a relay coil 38 that operates a pair of movable contacts 40 and 50 that are ganged together as indicated by the dashed line. Movable contact 40 is movable between a pair of stationary contacts 42 and 44 and movable contact 50 is movable between a pair of stationary contacts 52 and 54. The respective positions of the movable contacts are indicated by the letters A and B, with each movable contact occupying either its A position or its B position. Movable contact 40 and stationary contact 42 are connected in series between the input of tuner 20 and RF signal input terminal 14. An impedance, for example, a resistor 46 is connected across contacts 40 and 42. Similarly, stationary contacts 50 and 54 are connected between the output of decoder 22 and the RF signal output terminal 16.

Power supply 26 develops approximately 12 volts DC on a lead 60, which is connected to the junction of a resistor 66 and the emitter of a PNP transistor switch 62. The base of transistor 62 is connected to resistor 66 and to a resistor 64, the other end of which is connected to microprocessor 24, via a lead 61. The collector of transistor 62 is connected to the junction of relay coil 38 and another relay coil 70. Relay coil 70 operates a movable contact 72 which completes a circuit, via a stationary contact 74, between one side of the input AC power line and AC outlet 30.

In operation, AC power is applied via plug 28 to power supply 26 which energizes microprocessor 24, which develops +12 volts on lead 61. Consequently the base and the emitter of transistor 62 are at the same potential and transistor 62 is not conductive. When microprocessor 24 turns on decoder 22, in response to receipt of an appropriate signal from keyboard 32 or IR receiver 34, lead 61 is placed at ground potential. The power supply potential is at +12 volts and the potential on lead 61 is at ground. Transistor 62 is forward biased to drive it into conduction and place its collector at approximately +12 volts. Thus relay coils 38 and 70 are energized. Relay coil 70 closes contact 72 to energize AC outlet 30 and relay coil 38 operates movable contacts 40 and 50 to their A positions. In the A positions, the RF signal at RF signal input terminal 14 is applied to tuner 20 and the signal output from decoder 22 is applied to the RF signal output terminal 60. This is the normal or decoder mode of operation.

It will be appreciated that resistor 46, which has a large value, is bypassed by closure of movable contact 40 and stationary contact 42 and a substantially undiminished signal is applied to tuner 20. When decoder 22 is disabled, in response to a command to microprocessor 24 from keyboard 32 or IR receiver 34, transistor 62 is not conductive and relay coils 38 and 70 are not energized. In this condition, movable contacts 40 and 50 revert to their B positions. The RF input signal path is via RF signal input terminal 14, movable contact 40, stationary contacts 44 and 52, movable contact 50 to RF signal output terminal 16. The input signal at terminal 14 is seen to be bypassed to the RF output terminal 16 except for the small amount that is directed through tuner 20 to decoder 22 through resistor 46. In practice this amounts to approximately a 1 dB signal loss in the bypassed signal and minimally affects the signal quality delivered to the user's TV receiver. The small signal directed to decoder 22 via resistor 46 is sufficient to assure reliable reception of data by decoder 22 from the head-end.

Figure 2:
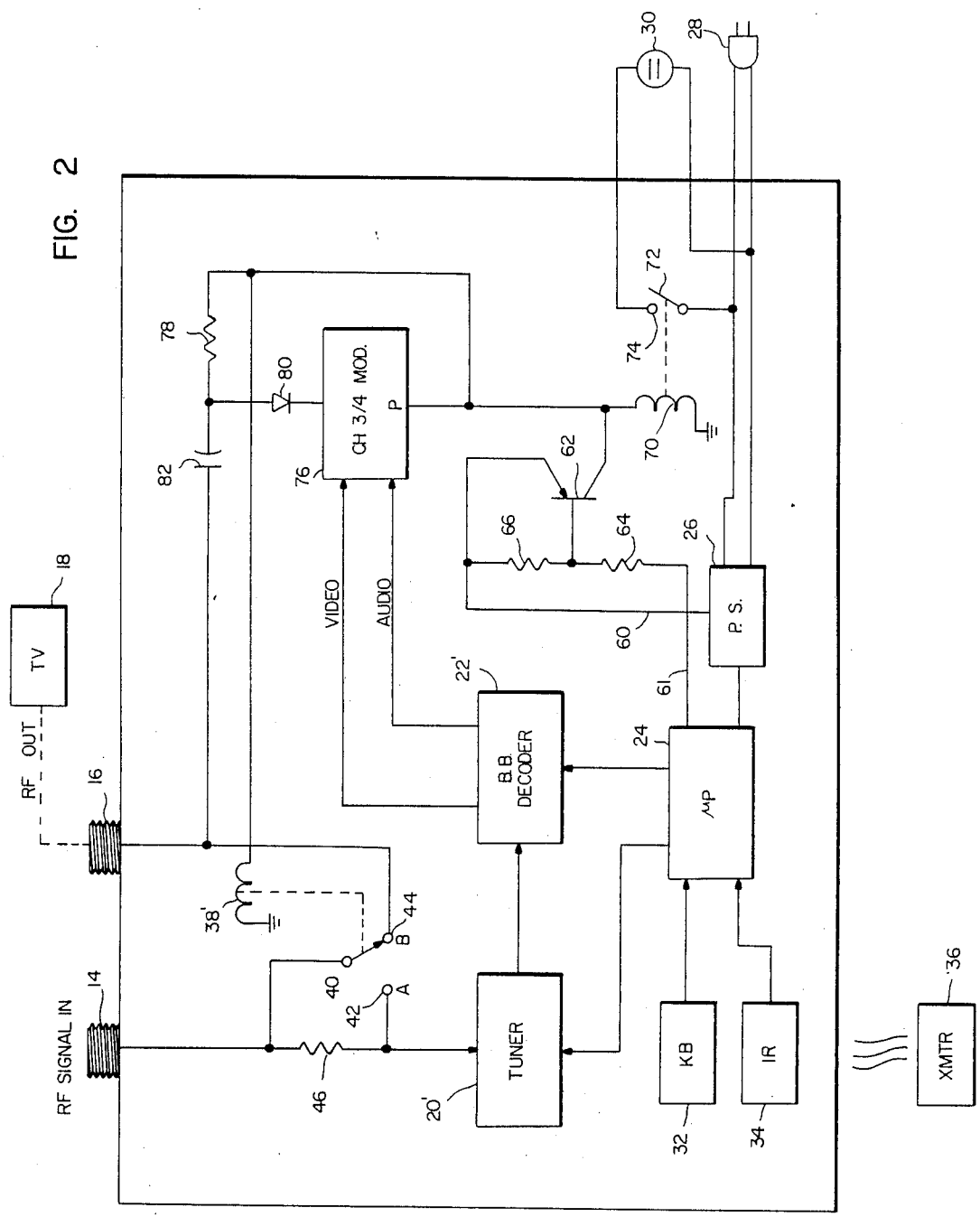
FIG. 2 is another version of the TV signal switch system.

The system as described in FIG. 1 is especially suitable for use with RF type decoder systems. In such systems, a high degree of isolation is required since the RF channel modulator cannot be turned off as it can be in a baseband system. In FIG. 2, a simpler switching arrangement is feasible due to the lower isolation requirement because the modulator can be turned off.

In general, the system of FIG. 2 operates substantially the same as that of FIG. 1 with like numbered components performing similar functions. The FIG. 2 implementation is especially applicable to baseband decoding arrangements. Tuner 20' supplies the baseband decoder 22' which produces video and audio output signals that are applied to a channel 3/4 modular 76. Relay coil 38' only operates a single movable contact rather than two as in FIG. 1. Stationary contact 44 is connected to RF signal output terminal 16 and to a capacitor 82. The other end of capacitor 82 is connected to the junction of a resistor 78 and the anode of a PIN diode 80, the cathode of which is connected to the output of modulator 76. The other end of resistor 78 is connected to the junction of relay coils 38' and 70. This connection also extends to the power terminal P on the modulator 76.

The operation of the FIG. 2 circuit differs in that the modulator 76 is also turned on when the decoder 22' is enabled. The output of modulator 76, during operation, develops a negative potential which, in conjunction with the positive voltage developed at the anode of PIN diode 80, forward biases PIN diode 80 and permits signals from modulator 76 to pass to RF signal output terminal 16. In the off condition, that is when decoder 22' is disabled by microprocessor 24, it will be recalled that microprocessor 24 applies +12 volts on lead 61 to disable the transistor switch 62. Terminal P on modulator 76 is at ground potential when the modulator is turned off. Under these conditions, PIN diode 80 is not conductive, relay coil 38' is not energized and movable contact 40 occupies position B in which stationary contact 44 is coupled thereto. Thus the television signal from RF signal input terminal 14 is supplied directly to RF signal output terminal 16. The signal is not diverted via diode 80, because diode 80 is not conductive. Here again, a small amount of input signal is supplied through resistor 46 to tuner 20', allowing the decoder system to receive data from the cable head-end.

What has been described is a novel TV signal switching arrangement which involves minimal signal loss and is automatic in operation. It is recognized that numerous changes and modifications in the described embodiment of the invention will be apparent to those skilled in the art without departing from its true spirit and scope. The invention is to be limited only as defined in the claims.

What is claimed is:

1. Television signal processing means having a signal input terminal and a signal output terminal comprising:
    decoder means having an input and an output, said output adapted to be coupled to said signal output terminal;
    tuner means connected between said signal input terminal and said decoder means input; and
    bypass switch means for selectively (a) connecting said signal input terminal to said signal output terminal while permitting reduced signal coupling to said tuner means and (b) permitting full signal coupling to said tuner means and coupling said decoder means output to said signal output terminal.

2. The system of claim 1 wherein said bypass switch means is operated in response to activation of said decoder means.

3. The system of claim 2 wherein said bypass switch means includes relay means having a first set of contacts connected in series between said signal input terminal and said tuner means; and an impedance coupled across said relay contacts.

4. The system of claim 3 wherein said relay means has a second set of relay contacts connected in series between said signal output terminal and the output of said decoder means.

5. The system of claim 3 wherein said decoder means includes a decoder operating at baseband frequencies and a modulator having an RF output terminal, and further including:

diode means connecting said RF output terminal to said signal output terminal; and means for biasing said diode means conductive to couple signal from said RF modulator to said signal output terminal.

6. A television signal switching arrangement comprising:

an RF signal input terminal;

an RF signal output terminal;

a tuner having an input connected to said RF signal input terminal and an output;

a decoder having an input coupled to said tuner output and an output couplable to said RF signal output terminal;

relay controlled switch means for selectively (a) connecting said RF signal input terminal to said tuner input and enabling said decoder output to couple RF signals to said RF signal output terminal and (b) directly connecting said RF signal input terminal to said RF signal output terminal and disabling said decoder output from coupling RF signals to said RF signal output terminal; and an impedance connected between said RF signal input terminal and said tuner input for supplying some input signal to said tuner continuously.

7. The system of claim 6, further including microprocessor means for enabling said decoder;

power supply means for supplying power to said microprocessor means; and means for energizing said relay controlled switch means when said microprocessor means enables said decoder.

8. A television signal switching arrangement comprising:

a television signal input terminal;

a television signal output terminal;

a tuner having an input and an output;

a baseband decoder connected to said tuner output for supplying audio and video signals;

an RF modulator receiving said audio and video signals and developing a modulated signal;

diode means connected between said RF modulator and said television signal output terminal;

an impedance coupled between said television signal input terminal and said tuner input; and bypass switch means for shorting said impedance and biasing said diode means conductive to permit said modulated signal to flow to said television signal output terminal.

9. The system of claim 8, further including microprocessor means for enabling said baseband decoder;

power supply means for energizing said microprocessor means; and means for actuating said bypass switch means when said microprocessor means enables said baseband decoder.

10. The system of claim 9 wherein said bypass switch means includes a relay coil, and further including:

a transistor switch connected to said relay coil and to said power supply means and being activated by said microprocessor means.

* * * * *